Figure 1:
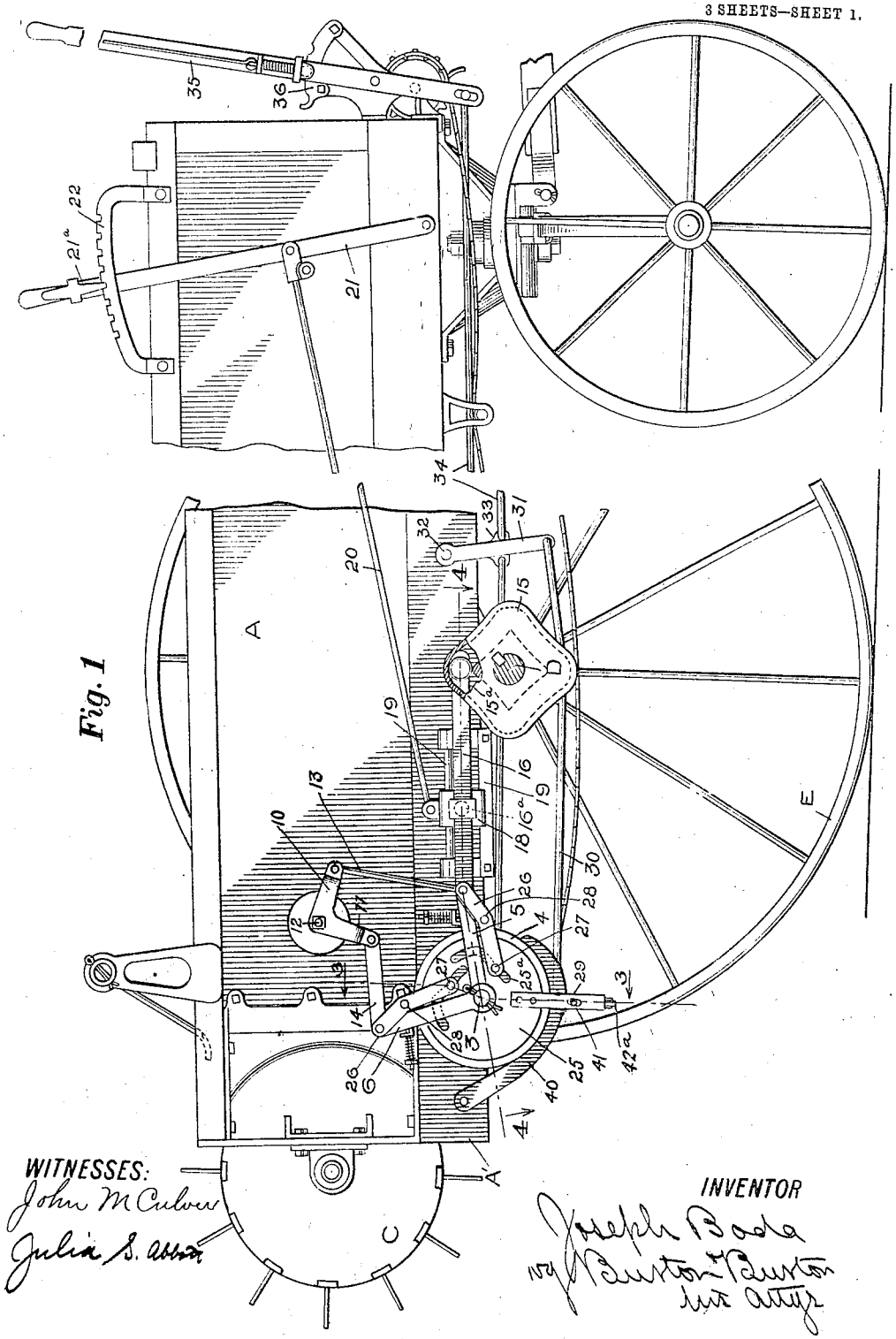

J. BODA.
FERTILIZER DISTRIBUTER.
APPLICATION FILED APR. 13, 1908.

921,667.

Patented May 18, 1909.
3 SHEETS—SHEET 1.

WITNESSES:
John M Culver
Julia S. ...

INVENTOR
Joseph Boda
by Burton & Burton
his attys

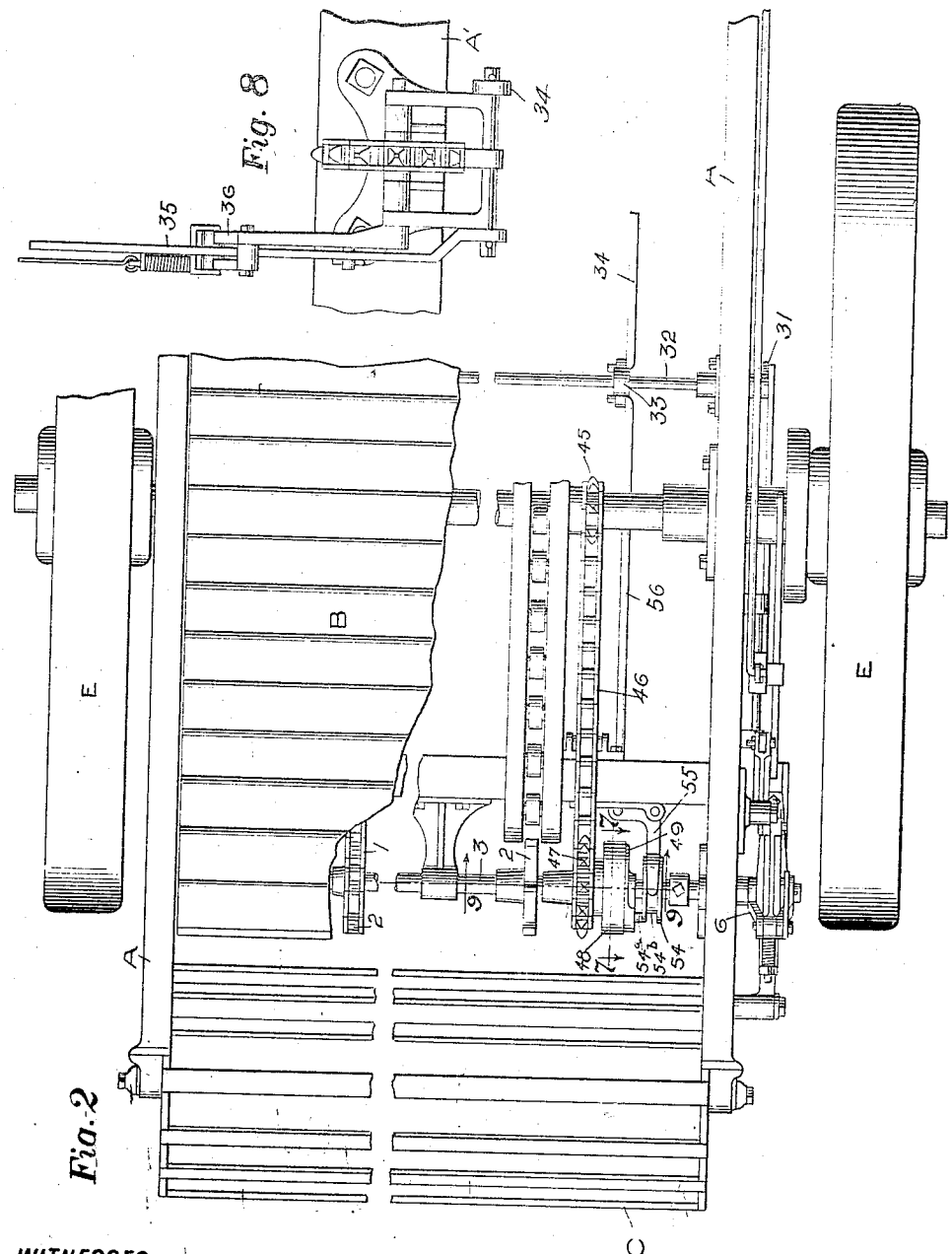

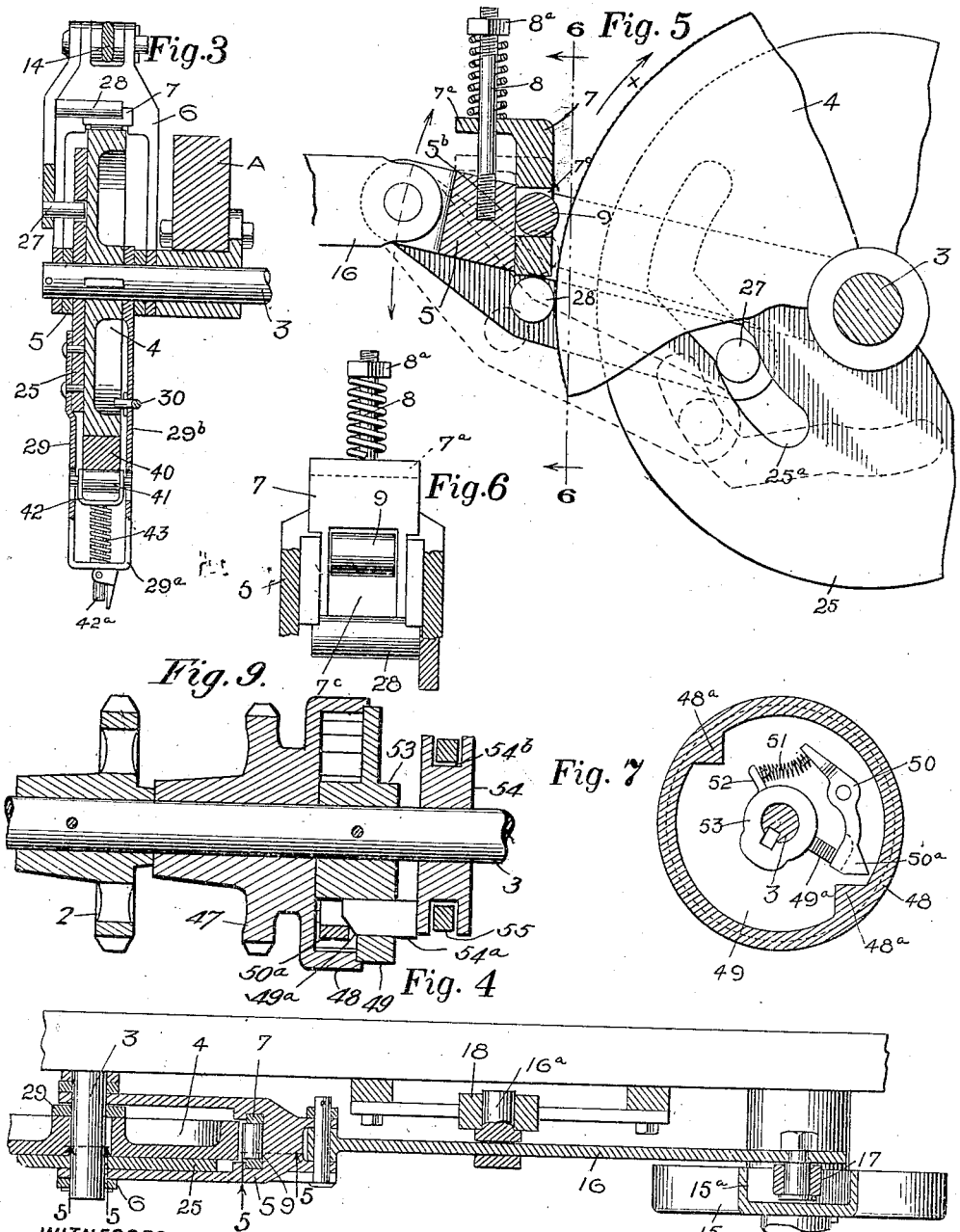

UNITED STATES PATENT OFFICE.

JOSEPH BODA, OF PLANO, ILLINOIS, ASSIGNOR TO INDEPENDENT HARVESTER COMPANY, OF PLANO, ILLINOIS, A CORPORATION OF MAINE.

FERTILIZER-DISTRIBUTER.

No. 921,667.

Specification of Letters Patent.

Patented May 18, 1909.

Application filed April 13, 1908. Serial No. 426,707.

*To all whom it may concern:*

Be it known that I, JOSEPH BODA, a citizen of the United States, residing at Plano, in the county of Kendall and State of Illinois, have invented new and useful Improvements in Fertilizer-Distributers, of which the following is a specification, reference being had to the drawings forming a part thereof.

The purpose of this invention is to provide an improved mechanism for operating or controlling the operation of the feeding device of a fertilizer distributer.

It consists of the features of construction shown and described as indicated in the claims.

In the drawings:—Figure 1 is a side elevation of a fertilizer distributer embodying this invention, broken away at the middle part to condense in respect to length. Fig. 2 is a detail plan of the rear portion of the structure shown in Fig. 1, having the conveyer apron in part broken away to disclose the mechanism below. Fig. 3 is a section at the line 3—3 on Fig. 1 upon an enlarged scale. Fig. 4 is a section at the line 4—4 on Fig. 1 upon a scale corresponding to Fig. 3. Fig. 5 is a partly sectional detail side elevation of the parts shown in Fig. 4, section being made at the line 5—5 on Fig. 4. Fig. 6 is a detail section at the line 6—6 on Fig. 5. Fig. 7 is a detail section at the line 7—7 on Fig. 2. Fig. 8 is a detail front elevation of the hand lever and connections for operating the feed-controlling devices. Fig. 9 is a detail section at the line 9—9 on Fig. 2.

This invention is a fertilizer distributer of the type which comprises a receptacle or wagon box, A, whose bottom is formed by a conveyer apron, B, propelled for delivering the material rearward within reach of a distributer, C. The conveyer apron, B, is propelled by chains, 1, 1, (only one of which is shown) driven by sprocket wheels, 2, 2, mounted on a conveyer-operating shaft, 3, journaled upon the lower sill, A', of the wagon box or receptacle, A. The shaft, 3, is rotated for propelling the conveyer apron, B, rearward,—that is, in the direction for delivering the load,—by means of a clutch wheel or disk, 4, pinned fast to the shaft, 3, and engaged by two clutch devices mounted respectively in two forked levers, 5 and 6, both striding the wheel, 4, and pivoted on the shaft, 3, having the clutching devices mounted in the fork for engaging the periphery of the wheel, 3. These clutching devices on the two clutch levers are of identical construction and the description of one will suffice for both.

Fig. 5 shows the clutch devices on the lever, 5, in connection with which they will now be described. Mounted for sliding between the fork arms of said lever, 5, in direction obliquely transverse to the lever, and for that purpose being fitted into an obliquely transverse guideway formed in the crotch of the lever, as most clearly seen in Fig. 4, there is a plunger bar, 7, which, besides being guided in the oblique transverse direction of its guideway, which can be observed in Fig. 5, in which its oblique direction is defined by the shoulder, 5$^b$, is further guided for reciprocation in the same direction by a stud, 8, set into the lever and extending therefrom parallel to said oblique guideway and the shoulder, 5$^b$, thereof, the plunger having an offset arm, 7$^a$, engaged with said guide stud, 8, a spring coil about the stud above said arm, 7$^a$, being stopped by a nut, 8$^a$, for operating upon the plunger to thrust it downward; that is to say, toward the narrower end of the space defined between the oblique shoulder, 5$^b$, and the periphery of the wheel, 4. See Fig. 5. The plunger, 7, has an aperture, 7$^c$, in which is lodged a clutch roller, 9, whose diameter is a little greater than the thickness of the plunger, so that the roller, lodging against the rear oblique shoulder, 5$^b$, of the plunger guideway, protrudes through the opposite face of the plunger for engagement with the periphery of the wheel, 4, its protrusion being sufficient for such engagement when the plunger is at the limit of its thrust in the direction of the narrow end of the interval mentioned, as indicated in dotted line in Fig. 5. When the plunger is in this position, it will be seen that the rocking of the lever arm in which it is mounted about the shaft, 3, will cause the wheel to be engaged and rotated in the direction of the arrow, $x$, on Fig. 5, the clutch roller, 9, riding loosely over the periphery of the wheel in the reverse movement of the lever.

The two levers, 5 and 6, with their respective clutch devices such as described, are mounted for oscillation toward and from each other about the shaft, 3, and the clutch devices in both of them being mounted for engagement with the wheel in the same direction, the alternate approach and retreat of the two levers with respect to each other oscillating about the shaft will cause the wheel, 3, and thereby the shaft, to be rotated continuously with step by step movement without appreciable interval between the steps, provided there is no appreciable interval between the two movements in opposite directions of the two levers, because when one lever is rocking in direction to engage the wheel, the other lever rocking in opposite direction is carrying its clutch roller idly back over the wheel, and as soon as the motion of the levers is reversed, the second lever engages the wheel for rotation while the first lever returns idly to initial position. The two levers are connected for causing them to thus rock alternately back and forward toward and from each other, by means of the bell-crank lever, 10—11, fulcrumed at its angle on a stud axle, 12, mounted upon the side of the wagon box, A, the arm, 10, of the bell-crank lever being connected by a link, 13, to the lever, 5, while the other arm, 11, is connected by a link, 14, to the lever, 6, the two forked levers, 5 and 6, being positioned on the shaft, 3, at an angle to each other approximating ninety degrees at the intermediate point in their respective paths of oscillation.

For communicating movements to the levers, 5 and 6, connected as above described, there is provided on the axle, D, of the traction wheels, E, E, at one end of said axle, a face cam, 15, having a continuous serpentine cam slot, 15ª, on its inner face, and a lever, 16, having a stud-and-roll abutment, 17, engaging the serpentine slot is slidingly pivoted at 16ª on a block, 18, mounted for adjustment on longitudinal guideways, 19, carried by the wagon box, A. The end of said lever, 16, remote from its engagement by means of the abutment, 17, with the serpentine cam slot is pivotally connected to the lever, 5. This connection causes the rotation of the serpentine cam by rocking the lever, 16, at its engagement with the cam slot back and forth toward the axis of the shaft, D, to rock the lever, 5, back and forth about the shaft, 3, the sliding of the lever, 16, at its sliding pivotal bearing, 16ª, serving to accommodate the movement of its pivotal connection with the lever, 5, about the shaft, 3. The rate of rotation of the shaft, 3, is varied by varying the length of the feed stroke of the levers, 5 and 6, and this is effected by shifting the fulcrum of the lever, 16, to vary the throw of the end connected with the lever, 5, For this purpose the slide block, 18, on which the lever, 16, is fulcrumed as stated, is connected by a rod, 20, with a hand lever, 21, fulcrumed at its lower end on the lower sill, A¹, of the wagon box, the upper end being in position for operation by the driver and having any convenient means, as the slide dog, 21ª, for engaging the notched segment, 22, to lock it in any position to which it may be adjusted about its fulcrum for adjusting the block, 18, on its guideways.

In order to disengage the shaft, 3, from its actuating clutches described, there is mounted loose on the shaft, 3, inside the outer fork arm of the lever, 5, which is mounted inside the forked lever, 6, a cam disk, 25, having two cam slots, 25ª, 25ª, and there are pivoted on the same pivots which connect the levers, 5 and 6, to the links, 13 and 14, respectively, the clutch releasers, 26, 26, each having a stud, 27, taking into one of the cam slots, 25ª, and also a stop stud, 28, projecting past the end of the corresponding clutch plunger, 7. The disk, 25, has an operating arm, 29, which, for certain additional purposes, is formed in a loop, 29ª, of which the other side bar, 29ᵇ, is hung on the shaft, 3, inside the wheel, 4; that is, between said wheel and the inner fork arm of the lever, 5. A rod, 30, connected to the arm, 29, extends forward and is connected at its forward end with a crank arm, 31, of a rock shaft, 32, mounted in the lower sill, A¹, of the wagon box, and having a lever arm, 33, connected by a rod, 34, extending forwardly therefrom to the lower end of the operating lever, 35, fulcrumed at the center of a segment, 36, at the forward end of the wagon box and in position to be grasped by the driver at its upper end for rocking it back and forth and engaging it with and disengaging it from the segment in a manner which needs no description. The rocking of the lever, 35, rearward at its upper end, causing it to pull the rod, 34, forward, rocks the shaft, 32, causing its crank arm, 31, by means of the connecting rod, 30, to rock the plate, 25, about the shaft, 3, in direction for causing it, by means of its cam slots, 25ª, to actuate the clutch releasers, for thrusting the clutch plungers, 7, outward with respect to the wheel, 4, disengaging the clutch rollers, 9, from said wheel and interrupting the feeding action. This action is against the tension of the springs on the guide studs, 8, 8.

In order to promptly arrest the movement as well as to hold the conveyer against traveling in either direction by reason of the inclination of the vehicle when operating on a hillside, a brake-shoe, 40, is provided pivoted on the sill, A¹, and operated by means of the loop, 29ª, of the arm 29, through which the brake-shoe extends above a roller, 41, which is mounted in a bearing fork, 42, within the loop, 29ª, and is provided with a spring, 43, coiled around the stem, 42ª, of said bearing fork reacting against the lower end of the loop for forcing the roller up against the shoe and thereby holding the shoe up against the wheel, 4. In order that the rotation of the cam disk, 25, in direction for disengaging the clutch devices and terminating the driving action of said devices on the wheel, 4, may press the brake against the wheel, and the contrary movement of said devices for bringing them into action may release the wheel from the brake-shoe, said brake-shoe, which in general is curved to fit the periphery to the wheel is tapered for reducing it in thickness from a point immediately below the wheel both back toward the fulcrum and to its free end so that when the arm, 29, is operated for engaging the shaft, 3, with either driving train, the roller, 41, is thereby swung around toward a reduced portion of the brake shoe, and the latter is left hanging freely between the periphery of the wheel and the roller, and when the hand lever, 35, is operated in either direction for disengaging the shaft, 3, the resulting movement of the arm, 29, causes the brake shoe to be wedged between the roller and the periphery of the wheel.

For driving the conveyer apron, B, in the opposite direction from which it is driven by the clutch engaged wheel, 4, there is provided on the axle, D, a sprocket wheel, 45, around which passes a chain, 46, for driving a sprocket wheel, 47, which is loose on the shaft, 3. And rigid with the sprocket wheel, 47, there is one element of a clutch device which consists of an annular flange, 48, projecting from the web of the sprocket wheel. Fast on the shaft adjacent to the flange and on the opposite side thereof from the body of the sprocket wheel, there is a disk, 49, to which there is pivoted a clutch dog, 50, overhung by the flange, 48, a spring, 51, being provided reacting against a stop, 52, which projects from the hub, 53, of the disk for holding the head of the dog normally inward against said hub whereby it is clear of abutments, 48ª, 48ª, which project inwardly from the flange, 48, at opposite points in the circumference thereof. The disk, 49, has a slot, 49ª. Mounted loose on the shaft, 3, at the opposite side of the disk from that at which the sprocket wheel stands, there is a grooved wheel, 54, having a wedge-shaped finger, 54ª, projecting from it through the slot, 49ª, for engaging inside the head, 50ª, of the dog,—that is, between said head and the hub, 53, of the disk on which the dog is pivoted. A shipping lever, 55, engages the peripheral slot, 54ᵇ, of the wheel 54, for sliding the latter on the shaft, 3. When the wheel is moved by the shipping lever so as to thrust its wedge-shaped finger, 54ª, through the slot, 49ª, for forcing the head, 50ª, of the dog outward, said dog being thus held in the path of the abutments, 48ª, is engaged by one of them, and the shaft, 3, is thereby rotated in direction for propelling the apron forward,—that is, in its return path after delivering its load. The lever, 55, is operated by a rod, 56, connected with a lever arm, 33, with which the operating rod, 34, above mentioned is also connected, so that the hand lever, 36, when rocked rearward over the segment in the first part of that movement by means of the lever arm, 31, of the shaft, 32, adjusts the cam plate, 25, for disengaging the clutch devices from the wheel, 4, and holding the brake, 40, up against said wheel to arrest its rotation, and in the latter part of said movement by means of the rod, 56, operating the shipping lever, 54, it causes the engagement of the clutch devices described for connecting the sprocket wheel, 47, with the shaft, 3, for rotating it in the opposite direction from that in which it was rotated by the clutch-driven wheel, 4.

I claim:

1. In a fertilizer distributer, in combination with a conveyer driving shaft, a clutch wheel thereon; two levers fulcrumed on the shaft; clutch devices carried by the levers for wedgingly engaging the wheel when the levers are rocked in one direction and relieving therefrom when rocked in the other direction; carriers for the clutch devices on the levers; means for moving the carriers on the levers to take the clutch device out of operative position, and connections for operating such clutch-carrier moving means at will.

2. In a fertilizer distributer, in combination with a conveyer driving shaft, a clutch wheel thereon; two levers fulcrumed on the shaft; clutch devices carried by the levers for wedgingly engaging the wheel when the levers are rocked in one direction and relieving therefrom when rocked in the other direction; carriers for the clutch devices on the levers; means for moving the carriers on the levers to take the clutch device out of operative position; connections for operating such clutch-carrier-moving means at will, and a brake for the wheel connected with and operated by the clutch-carrier-moving means.

3. In a fertilizer distributer, in combination with a conveyer driving shaft, a clutch wheel thereon; two levers fulcrumed on the shaft; clutch devices carried by the levers for wedgingly engaging the wheel when the levers are rocked in one direction and relieving therefrom when rocked in the other direction; carriers for the clutch devices on the levers; a clutch releaser operatively connected with each lever and operating upon the clutch-device carrier thereon; a cam plate pivoted co-axially with the shaft and articulated with the clutch releasers and means operable at will for rocking the cam.

4. In a fertilizer distributer, in combination with the conveyer, a driving shaft for the same; a clutch wheel on the shaft; clutch devices for engaging the wheel; clutch releasers for taking the clutch devices out of operative relation to the wheel; a brake for the clutch wheel, and means for operating the clutch releasers operatively related to the brake for setting it against the wheel when the clutch devices are released.

In testimony whereof, I have hereunto set my hand at Plano, Illinois, this 8th day of April, A. D., 1908.

JOSEPH BODA.

Witnesses:
W. H. LONG,
GEORGE F. BARRETT.